United States Patent
Cordeiro et al.

(10) Patent No.: US 8,902,822 B2
(45) Date of Patent: Dec. 2, 2014

(54) ARRANGEMENTS FOR ASSOCIATION AND RE-ASSOCIATION IN A WIRELESS NETWORK

(75) Inventors: Carlos Cordeiro, Portland, OR (US); Alex Kesselman, San Jose, CA (US); Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 12/228,900

(22) Filed: Aug. 15, 2008

(65) Prior Publication Data
US 2009/0232063 A1 Sep. 17, 2009

Related U.S. Application Data

(60) Provisional application No. 61/035,480, filed on Mar. 11, 2008.

(51) Int. Cl.
*H04W 4/00* (2009.01)
*H04B 7/06* (2006.01)
*H01Q 3/26* (2006.01)

(52) U.S. Cl.
CPC .............. *H01Q 3/26* (2013.01); *H04B 7/0682* (2013.01); *H04B 7/0617* (2013.01)
USPC ........................................................ 370/329

(58) Field of Classification Search
USPC .......................................... 370/329, 334, 339
See application file for complete search history.

(56) References Cited

U.S. PATENT DOCUMENTS

| | | | | |
|---|---|---|---|---|
| 6,031,877 A * | 2/2000 | Saunders | ...................... | 375/267 |
| 6,489,923 B1 * | 12/2002 | Bevan et al. | .................. | 342/378 |
| 7,301,924 B1 * | 11/2007 | Gurbuz et al. | ................ | 370/335 |
| 7,916,081 B2 * | 3/2011 | Lakkis | ........................... | 342/367 |
| 7,920,540 B2 * | 4/2011 | Singh et al. | ................... | 370/347 |
| 7,929,412 B1 * | 4/2011 | Gurbuz et al. | ................ | 370/208 |
| 8,306,060 B2 * | 11/2012 | Ngo et al. | ..................... | 370/473 |
| 2002/0150182 A1 | 10/2002 | Dogan et al. | | |
| 2005/0202859 A1 | 9/2005 | Johnson et al. | | |

(Continued)

FOREIGN PATENT DOCUMENTS

| CN | 1602087 A | 3/2005 |
|---|---|---|
| CN | 1808942 A | 7/2006 |

(Continued)

OTHER PUBLICATIONS

International Search Report/Written Opinion received for PCT Patent Application for PCT/US2009/036822, mailed on Oct. 27, 2009, 11 pages.

(Continued)

*Primary Examiner* — Mohammad Anwar
(74) *Attorney, Agent, or Firm* — Sutherland Asbill & Brennan LLP

(57) ABSTRACT

A method is disclosed for associating network devices to a network. The method can include receiving a beacon from a source by an antenna array, allocating resources to beamform and beamforming after receiving at least a portion of the beacon. The beamforming can be accomplished prior to completion of an association request and prior to receipt of an acceptance signal in response to the association request. Accordingly directional transmissions can be utilized transmit at least part of an association request and to transmit an acceptance signal corresponding to the association request.

28 Claims, 4 Drawing Sheets

(56) References Cited

U.S. PATENT DOCUMENTS

| | | | |
|---|---|---|---|
| 2007/0258384 A1 | 11/2007 | Sammour et al. | |
| 2007/0280163 A1* | 12/2007 | Zhang | 370/331 |
| 2008/0176561 A1 | 7/2008 | Shao et al. | |
| 2009/0232106 A1 | 9/2009 | Cordeiro et al. | |
| 2009/0233549 A1 | 9/2009 | Maltsev et al. | |

FOREIGN PATENT DOCUMENTS

| | | | |
|---|---|---|---|
| EP | 1816758 | A2 | 8/2007 |
| EP | 1845584 | A1 | 10/2007 |
| GB | 2317786 | A | 4/1998 |
| JP | 08-167871 | A | 6/1996 |
| JP | 2001-203617 | A | 7/2001 |
| JP | 2003-163669 | A | 6/2003 |
| JP | 2003-332971 | A | 11/2003 |
| JP | 2008-042669 | A | 2/2008 |
| WO | 2004/054153 | A2 | 6/2004 |
| WO | 2004/054153 | A3 | 12/2004 |
| WO | 2005/120091 | A2 | 12/2005 |
| WO | 2009/114621 | A2 | 9/2009 |
| WO | 2009/114621 | A3 | 12/2009 |
| WO | 2011/106517 | A1 | 9/2011 |

OTHER PUBLICATIONS

Office action received for Japanese Patent Application No. 2010-547877, mailed on Oct. 25, 2011, 2 pages of Japanese office action and 2 pages of English translation.

Office action received for Korean Patent Application No. 10-2010-7020018, mailed on Aug. 30, 2011, 3 pages of Korean office action and 2 pages of English translation.

Office action received for Korean Patent Application No. 10-2011-71302417, mailed on Aug. 30, 2011, 3 pages of Korean office action and 2 pages of English translation.

Office Action received for Korean Patent Application No. 10-2010-7020018, mailed on Apr. 23, 2012, 2 pages of English Translation and 3 pages of Korean Office Action.

Office Action received for Korean Patent Application No. 10-2011-7002417, mailed on Apr. 23, 2012, 2 pages of English Translation and 3 pages of Korean Office Action.

Office Action received for Chinese Patent Application No. 200980109206.5, mailed on Oct. 10, 2012, 12 pages of office Action including 6 pages of English Translation.

European Search Report Received for European Patent Application No. 09719443.5, Mailed on Jul. 15, 2013, 8 pages.

Extended European Search Report received for European Patent Application No. 11152346.0, mailed on Jun. 28, 2013, 7 pages.

International Preliminary Report on Patentability and Written Opinion received for PCT Patent Application No. PCT/US2009/036822, Issued on Sep. 14, 2010, 5 pages.

Office Action received for Chinese Patent Application No. 200980109206.5, mailed on Jul. 11, 2013, 22 pages of Office Action Including 15 page of English Translation.

European Search Report Received for European Patent No. 09719443.5, Mailed on Aug. 1, 2013, 1 pages of Office Action.

Notice of Allowance received for Japanese Patent Application No. 2010-547877, mailed on Jul. 24, 2012, 1 page of Notice of Allowance only.

Office Action received for Japanese Patent Application No. 200980109206.5, mailed on Feb. 8, 2014, 10 page of English Translation and 6 pages of Japanese Office Action.

* cited by examiner

ARRANGEMENTS FOR ASSOCIATION AND RE-ASSOCIATION IN A WIRELESS NETWORK

FIELD

The present disclosure relates to wireless networks. More specifically, the present disclosure relates to association and re-association between devices in a wireless network.

BACKGROUND

In a typical wireless network, many devices can communicate with each other. To facilitate communications between multiple parties or devices, communications must be managed. Thus, each network typically has a communications controller such as an access point, a piconet controller (PNC), or a station that acts as a controller and manages network communications. Each station, such as a personal computer, can associate with the controller and thereby associate with the network, connect to the network and gain access to resources connected to the network. Stations and network controllers typically utilize a network interface card (NIC) to make an associate and communicate with the network. To increase system efficiency, some wireless networks utilize omni-directional transmissions to associate and directional transmissions for transaction in data.

Many wireless networks utilize a frequency of 2.4 GHz for communicating as defined by the Institute of Electrical and Electronics Engineers ((IEEE)) 802.11b, and g specification. Other wireless networks utilize a frequency of 5 GHz for communicating as defined by the IEEE 802.11a specification. IEEE 802.11a and b were published in 1999, and IEEE 802.11g was published in 2003. Stations that comply with the IEEE 802.11b standard may commonly be referred to or marketed as wireless fidelity (Wi-Fi) compatible devices. New wireless networks are being defined to operate in millimeter wave frequencies (e.g., 60 GHz band). Directional communications are important and in some cases required to achieve acceptable performance.

As stated above both omni-directional transmission and directional transmission are commonly utilized by wireless networks. An omni-directional transmission generally provides a traditional radiation pattern where the signal energy evenly propagates in a spherical nature or propagates evenly in three directions. A directional transmission can focus signal energy in a particular direction. More specifically, a directional transmission can operate more efficiently because more energy can be sent in the direction of the receiver while less energy is sent in directions where the signal is not intended to be received.

Likewise, a receiver can focus it's receive sensitivity in a particular direction. Thus, a transmitter can focus RF energy in a direction of a receiver and a receiver can focus receive sensitivity in a particular direction to mitigate interferences and increase communication efficiency. A directional transmission system can provide improved performance over omni-directional systems. For example, directional systems can utilize significantly higher data rates. However, such systems may be more complex and more expensive than traditional omni-directional transmission systems. Directional antennas can have gains that are much higher than omni-directional antennas due to the narrower beam width, which focuses RF power to the receiving system and does not waist RF power in directions where there are no receiving devices.

State-of-the-art millimeter wave network communication systems typically utilize a low data rate, quasi-omni transmission during an association procedure. An association procedure between devices can be accomplished utilizing a physical layer protocol as defined by the open systems interconnect (OSI) specification published in 1980. Physical layer transmissions mode is the lowest layer in the OSI model and the physical layer can be utilized by devices to set up and manage communications. The physical layer specifies primarily transmissions of raw bit streams over the physical transport medium. Such a bit stream can be utilized by stations to recognize the existence of a compatible network and to associate with the network.

Interference caused by devices such as cell phones and appliances often cause communication links between networked devices to be dropped. Dropped communication links also result from the movement of stations or movement of obstructions. As stated above, many networks utilize directional transmissions, and although these network communication links can be more efficient than omni directional links, these links can be fragile due to station mobility and ever changing factors that produce interference. Such factors often can cause frequent, undesirable station or network disconnects.

A network system operating at low power in the Gigahertz range, for example at 60 GHz, is typically more susceptible to communication link drops that a system that operates at lower frequencies. This increased susceptibility is generally attributed to the inherent propagation characteristics of a radio wave in the air as higher frequencies encounter a higher oxygen absorption rate and increased attenuation. The attenuation may be caused by physical obstructions, particularly metallic obstructions between the transmitter and the receiver. Most link drops or disconnects require devices to commence a re-association process. Such a re-association process takes a relatively long time, slowing all network communications. Such a re-association process also significantly adds to network overhead where the resources are not exchanging data at high rates as is desired.

Thus, a network controller having many stations that are continually being dropped will have to re-associate with stations on a frequent basis. Such a process may require a controller to spend a significant amount of time and overhead managing and configuring communications where such time would be better spent transmitting and receiving data. When stations continually have to re-associate with a controller, more time can be spent on ministerial functions to manage network infrastructure than the time spent on actual data transfer, where data transfer is the end goal of the network. Accordingly network communication management is less than perfect.

BRIEF DESCRIPTION OF THE DRAWINGS

Aspects of the disclosure will become apparent upon reading the following detailed description and upon reference to the accompanying drawings in which like references may indicate similar elements.

DETAILED DESCRIPTION OF EMBODIMENTS

Figure 1:
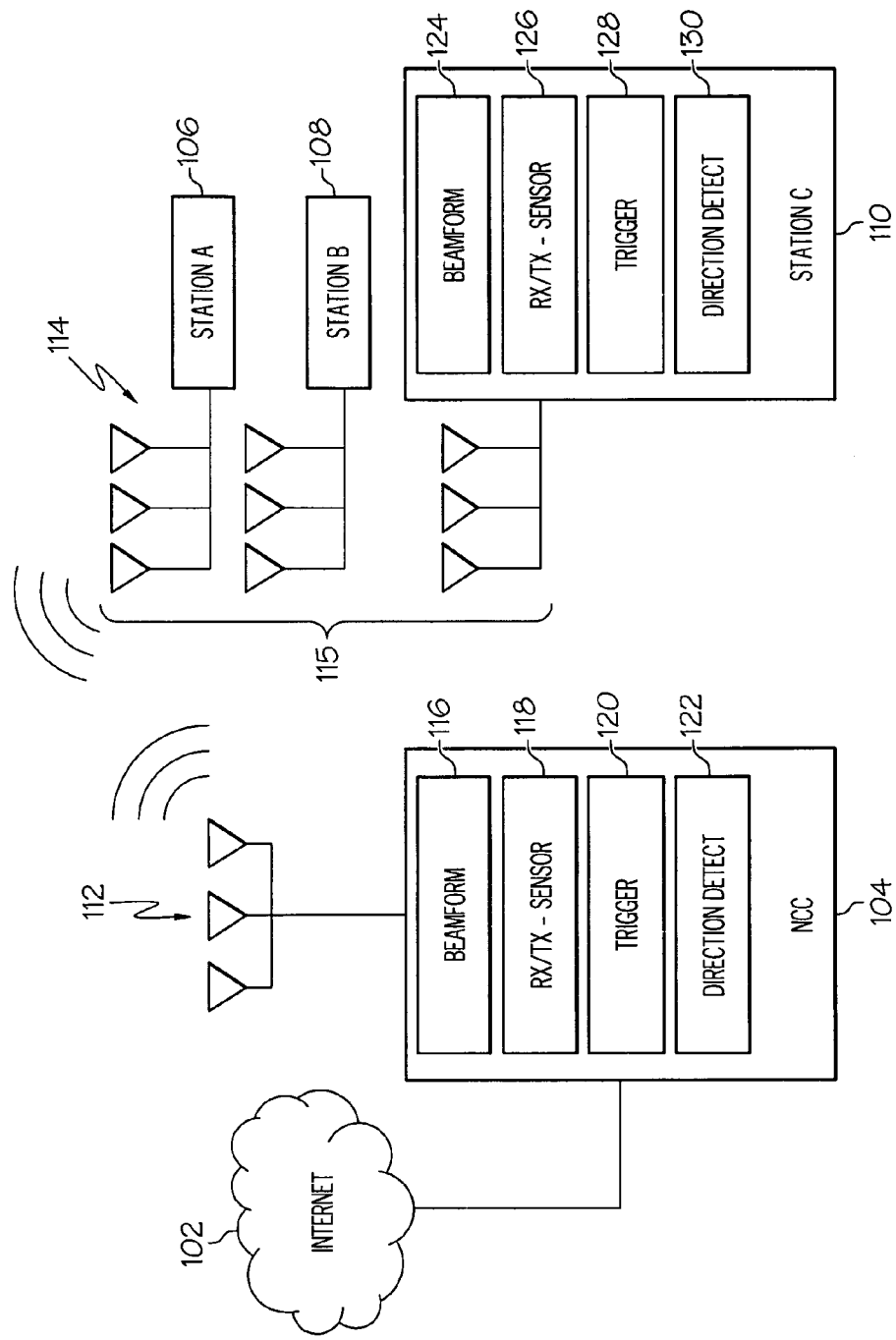
FIG. 1 is a block diagram of a network that can perform directional and omni-directional communications.

The following is a detailed description of embodiments of the disclosure depicted in the accompanying drawings.

Arrangements of systems, apparatuses, and methods are disclosed herein that can provide efficient association and re-association between a station and a network communication controller (NCC) in a wireless network. Such arrangements can be utilized to create a wireless local networks (WLAN)s, wireless personal area networks (WPAN)s, or generically just a wireless network (WN). Some embodiments disclosed herein are tailored to communication systems that transmit radio waves having wave lengths in the millimeter range. Such network type communication systems can operate at frequencies around the sixty (60) gigahertz range.

In accordance with the present disclosure, the amount of time that a station and network controller consumes utilizing omni-directional transmissions at lower data rates (i.e. an omni-mode) during association process can be significantly reduced. In some embodiments, a significant part of the association process can be performed in the directional mode. Thus, the usage of the omni mode during association can be limited to the minimum necessary information required to associate and re-associate while the bulk of the association and re-association process can be performed in a directional mode. Such a shift in the transmission mode allows the disclosed arrangements to consume less air time and less bandwidth and faster association times than traditional systems.

The disclosed embodiments can be described generally as association communications that reduce the time spent communicating in an omni-directional transmission phase and increase the time spent during the association process in a directional high speed transmission phase. Generally, the omni-directional transmission mode can transmit data in the one (1) Mega bit per second and the directional transmission mode can transmit data at 952 Mega bit per second. Accordingly, all of, or the majority of the data utilized in the association process that has been traditionally communicated utilizing low data rates in omni-directional transmissions, can now be communicated in a high speed directional mode.

The disclosed association arrangements can exchange a minimum amount of information between a network controller and a station at an omni data rate and then change to a directional high speed communication mode for the balance of the association process. Accordingly, nearly all of the association process can be conducted at higher communication speed and the time interval required to perform an association process and a re-association process can be greatly reduced. Such an early shift in transmission modes and data rates can allow much faster association times and re-association times for entities of a WN.

Typical WNs utilize both an omni-directional transmission in an omni mode and directional transmission in a directional mode to satisfy the basic design requirements or communication link "budget." Typical networks utilize an omni mode and very low data transmission rate, on the order of a few Mbps, in the association process omni mode to provide coverage in all directions and to compensate for the energy lost due to the antenna gain. Thus, in existing Gigahertz communications omni-directional transmissions and low data rates are utilized for management and control of frames and for association and re-association.

In existing systems, the omni mode is utilized for communication set up and device association while a directional high data rate mode is reserved for data transfer. Thus, in traditional systems, a directional mode can be commenced after a station associates with a controller and the stations are ready to perform data transfer.

In accordance with the present disclosure, after a station and a network communications controller (NCC) receive enough data via an omni-directional communication mode to identify each other and identify relative directions, the NCC and the station can switch to a directional transmission mode and implement communications utilizing a much higher data rate. Such a higher data rate in the directional mode can be on the order of a few Giga bits per second (Gbps) and such a higher data rate is possible since the directional link benefits from higher antenna gains and reduced interference.

Referring to Table 1 below, different parameters or phases of a traditional association process and the requirements for the parameters and phases of the traditional association process are illustrated. In accordance with the teachings herein, directional communications can be utilized for at least the majority of the association process. In some embodiments more that one half of the phases and parameters described below can be performed utilizing a directional mode thereby decreasing association times and increasing network efficiency and performance.

TABLE 1

Association Parameter intervals

| Name | Value |
| --- | --- |
| Directional preamble | 1.6 usec |
| Directional PHY and MAC header | 0.9 usec |
| Directional bit rate (base) | 0.952 Gbps |
| Omni Preamble | 50 usec |
| Omni payload bit rate | 1 Mbps |
| Full association payload size | 22 bytes |
| Minimum association payload size | 12 bytes |
| Disassociation payload size | 14 bytes |
| MAC header size | 92 bytes |

It can be appreciated that the traditional systems that comply with the current association protocols standards for Gigahertz wireless systems are very inefficient with respect to spectrum usage. In contrast some disclosed embodiments beamform and utilize higher data rates as soon as economically feasible in the association process. This early shift can significantly improve total network performance.

In both the European Computer Manufacturer's Association (ECMA) specifications and IEEE 802.15.3 specification, the association process between a NCC and a station is specified as being carried out utilizing almost exclusively an omni directional transmission mode. A typical association process may be comprised of an association request from a station and response message from a NCC at a low data rate. This traditional association process can create a significant amount of processing overhead and time delays which in accordance with the teachings herein can be largely avoided.

Communication channels managed by NCCs are often dropped due to interference from cell phones, microwave ovens, station mobility, environment mobility, etc. and the continual re-association required in traditional systems, generally causes significant complications such as relatively large communication delays. It can be appreciated that a major factor for such an undesirable delay due to channel drops is the time required to re-associate the devices. The time and resources consumed by the association and re-association process can be significant due to the traditional omni-directional low data rate transmission utilized by traditional association processes.

Referring to FIG. 1, a basic WN configuration 100 is illustrated. The WN 100 could be a WLAN or a WPAN that complies with one or more of the IEEE 802 set of standards. The WN 100 can include a NCC 104 that can be connected to one or more networks such as the Internet 102. In some embodiments, the NCC 104 could be a piconet controller (PNC). A piconet may be defined as a collection of stations occupying a shared physical channel. One of the stations can be set up as the NCC 104 and the remaining stations can then "connect" to the WN 100 via the control functions provided by the NCC 104. The NCC 104 can provide centralized synchronization and also manage quality of service (QoS) requirements, power saving modes, and access to the network for other devices.

In some embodiments the disclosed system can support most wireless technologies including wireless handsets such as cellular devices, or hand held computing devices that utilize WLAN, WMAN, WPAN, WiMAX, handheld digital video broadcast systems (DVB-H), Bluetooth, ultra wide band (UWB), UWB Forum, Wibree, WiMedia Alliance, WirelessHD, Wireless uniform serial bus (USB), Sun Microsystems Small Programmable Object Technology or SUN SPOT and ZigBee technologies. The system 200 may also be compatible with single antenna, sector antennas and/or multiple antenna systems such as multiple input multiple output systems (MIMO).

The NCC 104 can include an antenna array 112 to facilitate directional communications. The WN 100 can also include networkable stations or network devices such as station A 106, station B 108, and station C 110. Many WNs can transmit and receive data in segments commonly referred to as frames or superframes. Thus, WNs can utilize frames to manage connections (i.e. associations and re-associations) and disconnections (dis-associations) in a WN via a NCC 104. These frames can appropriately be called management frames. In addition to data frames that carry information in accordance with higher communication layers, a typical WN can transact in management and control frames that set up and support the data transfer process.

In operation, a network compatible station such as station C 110 can receive a beacon from the NCC 104 when entering an area serviced by NCC 104. A beacon can contain network communications management data. Since the beacon is transmitted in an omni-mode, the beacon can have a relatively low data rate.

The NCC 104 can transmit management frames, such as beacon frames where the beacon acts as a "heartbeat" of the network enabling station to establish and maintain network communications in an orderly fashion. Station 110 can detect possible network availability when station 110 receives beacon frames that are broadcast by the NCC 104 and NCC 104 can determine if the station 110 can be authenticated. The authentication request is also a management frame that can be sent by a station such as station C 110 to NCC 104. Yet another management frame an association request can be made by station C 110 when station C 110 is attempting to join WN 100. The association request can occur after station C 110 authenticates with the NCC 104 but before station C 110 can join the WN 100. In order to be associated with the network or the NCC 104, station C 110 can receive and utilize a frame having a medium access control (MAC) address. These management type frames can contain information such as the MAC address of NCC 104, capacities and capabilities of the NCC 104, and the NCC's service set identifier (SSID) among other things. If a request for access from station C 110 is acceptable and NCC 104 allows station C 110 to join the WN 100, NCC 104 can send a successful association response to station 104.

In accordance with some embodiments, during reception of the beacon, station C 110 can detect the relative location of NCC 104 or the relative direction of the NCC 104 with respect to the antenna(ae) of station C 110. After such a detection and receipt of beacon information mentioned above, station C 110 can begin a beam forming process. When the beamforming process is complete, station C 110 can begin transmitting at a higher data rate and reduce the time associated with the remainder of the association process. Likewise, the NCC 104 can perform beamforming as soon as the NCC 104 receives a signal from a station.

In some embodiments, each station 106-110 can have an antenna array illustrated by antenna arrays 115 and NCC 104 can also have an antenna array 112. In other embodiments, one or more sector antennas could be utilized in lieu of an antenna array. A sector antenna can be defined as a kind of directional antenna with a sector-shaped radiation pattern for point-to-multipoint connections. Such antenna configurations can allow NCC 104 or a station to determine a direction of arrival (DOA) of a signal. Antenna configurations can also allow for signal beam steering such that efficient high data rate point to point communications can be achieved between stations 106-110 and the NCC 104. As implied above a station, such as station C 110 can utilize DOA information obtained from the beacon signal to send the association request to the NCC 104 in a directional transmission mode.

Generally, the DOA can be determined based on the direction from which a propagating radio wave arrives at an array of antenna such as at antennas 112 or 115. The NCC 104, or possibly a station 110 can utilize a set of RF sensors or a sensor array to determine the DOA of the received signal. Similar to station C 110, NCC 104 can include receiver transmitter (R/T) sensor or just sensor 166 to detect the existence of a radio wave or electromagnetic energy and its relative direction in coordination with direction detection module 122. In some embodiments sensor 166 can activate the direction detection module 122. The detection module 122 can detect the direction of the transmitting antenna(s) source relative to the antennae(s) 112 of the NCC 104. Direction could also be ascertained by a station or an NCC utilizing a Global Positioning System (GPS) or some other navigation or location detection means.

Trigger module 118 can trigger or activate the beamforming module 120 to start the beamforming process based on the detection of RF energy by the sensor 166. Trigger module 118 can provide the trigger signal based on detected RF energy having a predetermined frequency or range of frequencies, a specific energy level and/or of a specific pattern. Trigger module 118 can also provide a trigger signal that is delayed a predetermined time from the detection of an RF signal and could utilize many other detected phenomena.

Thus, beamforming techniques can include estimating the relative direction where a radio signal originates. Beamforming techniques can also include periodically re-evaluating interference, signal strengths, etc, and refining/improving the quality of the link based on such an adaptive process. Various techniques for calculating the direction of arrival, such as angle of arrival (AoA), time difference of arrival (TDOA), frequency difference of arrival (FDOA), a hybrid of the above techniques, or other similar detection techniques could be utilized to determine the relative direction of a transmitting source. Thus, this information could be utilized to project a directional transmission or to focus a receiving antennae system. It can be appreciated that beam steering, directional communications, and directional reception can be achieved by many means such as those described in the art of antenna theory, phase shifting, etc., where such a description is beyond the scope of this disclosure.

The disclosed early beamforming process can allow stations such as station C 110 to achieve an association/connection status with a network via the NCC 104 much more efficiently than traditional association arrangements, technologies, systems, or methods. As stated above, the disclosed arrangements can utilize a high data rate, directional communication early in a communication exchange and such an early use can invoke the higher data rate to speed the association process. As stated above traditional networks utilize an omni-directional low data rate transmission for all, or at least the majority of the association process and the disclosed association process can be accomplished much faster than is accomplished by traditional systems.

In some embodiments, sensor 126 of station C 110 can detect the existence of radio wave or electromagnetic energy and can activate the direction detection module 130. The direction detection module 130 can detect the direction of the transmitting antenna(s) relative to the antenna(s) of station C 110. The trigger module 128 can trigger or activate a beamforming module 124 to start a beamforming process based on a signal provided by the trigger module 128. In some embodiments the trigger module 128 can provide the trigger signal based on a one or more detected parameter. The trigger signal could be delayed a specific time interval from the detection of the one or more parameters. It can be appreciated that for simplicity that station C 110 is illustrated with sub-components and although the illustration of station A 106 and station B 108 are not illustrated with components station A and B could have and utilize similar or identical components.

In some embodiments, beamforming can take place subsequent to the first exchange between the NCC 104 and station C 110 based on detected RF energy. Accordingly, beamforming at the NCC 104 and the stations can commence early in communications between the NCC 104 and a station possibly without any information exchange and on different frequencies.

After such beamforming, the balance of the association process and/or control information exchange can be performed utilizing directional transmissions and high data rates. Such a directional awareness and directional communications at an early stage can allow a station such as station C 110 to achieve a useable network connection significantly faster than traditional stations. In some embodiments, station C 110 can utilize direction of arrival (DOA) information and data obtained from the beacon transmission (which is typically the first transmission) to shift into a directional transmission mode based on a signal from trigger module 128. After the trigger and beamforming, the station C can send subsequent communication(s) required to complete the connection process. For example, probe communications and/or association requests could be sent by station C 110 in the directional high data rate mode. Similar to station C 110, the NCC 104 can switch to a directional mode based on receipt of a probe transmission or some other transmission received from a station that can be detected by the trigger module 118.

Once the NCC 104 receives a signal from the station attempting to connect the network via the NCC 104, the station can immediately go into a beamforming mode as the initial part of the association procedure. In some embodiments, beamforming can be done as part of the beacon and association request frame exchange without requiring a dedicated or allocated time allocation.

Therefore, when station C 110 beamforms towards the NCC 104 during the beacon frame or during other frames received as part of a superframe, beamforming can allow the station to send the association request in directional mode. Similarly, the NCC 104 can beamform towards the station by means of receiving the association request, and hence the NCC 104 can also send the association response in directional mode. In this case, the omni-directional transmission mode can be avoided altogether in the association process. It can be appreciated that in such a configuration there may be little or no need to allocate a specific time during a superframe or otherwise for beamforming.

When interference is present and communication channels between the NCC 104 and stations are dropped, data flow to and from the stations can be severely interrupted by such an administrative or communication management burden or overhead. The typical time consumed by a traditional association requests is 50 usec+92*8/1 Mbps+22*8/1 Mbps=50+736+176=962 micro seconds (usec). The time consumed in association response is 50 usec+92*8/1 Mbps+14*8/1 Mbps=50+736+112=898 usec. Hence, the total time to achieve association is calculated to be 1860 usec. This significant amount of time is often wasted on communication set up when a network is busy trying to move data between devices.

In some embodiments, beamforming between two stations can be set up prior to the association process by monitoring transmissions or communications. In this embodiment, all or nearly all transmissions can take place in the directional mode. It can be appreciated that if all the association process are conducted in directional high data rate transmission mode, the total time required by this process can be calculated as on the order of 5.303 usec a small fraction of the current association time. It can also be appreciated that when directional communications begin after a first association, the time to transact an association request can be calculated as 1.6 usec+0.9 usec+22*8/952 Mbps=1.6+0.9+0.185=2.685 usec. The corresponding association response can be calculated as 1.6 usec+0.9 usec+14*8/952 Mbps=1.6+0.9+0.118=2.618 usec. It can be appreciated that there may be a significant difference in performance/delay (i.e. approximately 1856 usec) between the disclosed arrangements and the current state-of-the-art or traditional networks.

For numerous reasons, including the complexity of implementation, "all" transmissions of the association process to be performed in directional high data rate mode may not be economically feasible. If utilizing a fully directional communication mode to perform the association process is not economically feasible, the association process can be initiated in an omni-directional transmission mode and as soon as beamforming is achieved, the communication format can be change over to the directional transmission mode. The changeover can be accomplished based on when the beamforming is triggered.

The calculations above indicate that the disclosed arrangements may allow for a station to associate with a controller about ninety-nine point seven percent (99.7%) faster than provided by traditional arrangements systems. This improvement in association times may be especially important for mmWave systems where frequent channel interruptions or link breakages due to roaming, mobility, and interference are common. The disclosed arrangements can also decrease the latency of (re)-association, thereby improving the Quality of Service (QoS) experienced by mission critical and real time applications. As stated above, a directional mode allows for significantly greater data rates and thus, the time required to complete an association process can be greatly reduced.

Although the teaching above describes a network with a central controller, the disclosed teachings also could be utilized by ad hoc networks. In ad hoc networks, there may be central network controllers or access points. In such a configuration, stations can be referred to as peers and one of the peers can assume the responsibility for sending the beacon and controlling communications. After receiving a beacon frame, each peer or station can wait for a beacon time interval and if no peer/station transmits a receivable beacon, then the waiting/listening peer can send a beacon after a random time delay.

This random time delay can provide that at least one station will send a beacon, and become a controlling peer and the random delay rotates the responsibility for sending beacons between peers. Instead of utilizing an access point, a controlling station, or controlling network interface card (NIC) can provide control for the ad hoc network.

A station can save the association and beamforming data that it utilizes during a communication session. When the communication channel between NCC 104 and station C 110 is dropped due to interference station C 110 can send a re-association request. In some embodiments there is no requirement to revert to the omni-directional transmission mode for the re-association request because the data from a previous association can be utilized to send the re-association request in a high data rate directional mode.

A station can send an association response back to another station or a controller using stored information network control information. A re-association request initiated by station C 110 may start by transmitting in "last known" direction of the NCC 104. When interference is present and communication channels between the NCC 104 and stations are dropped, data flow to and from the stations can be severely interrupted by such an administrative or communication management burden or overhead. NCC 104 in turn could answer the request in a directional mode based on stored information including the last known beamforming configuration. If a communication link cannot be established (or reestablished) or no acknowledgement signal is received by the station, the association request transmission from station C 110 could be repeated using beamforming where the beam is projected in different directions via a 360 degree scan.

Furthermore, the disclosed beamforming arrangements between stations can be done as a part of regular packet exchange without requiring specific channel time allocation(s). In some embodiments, beamforming can be performed through the reception and transmission of an omni-beacon and association request frames. It can be appreciated that the time taken by the disclosed WN 100 to achieve beamforming may not add additional overhead since beamforming already occurs and is "required" in millimeter wave systems.

Figure 2:
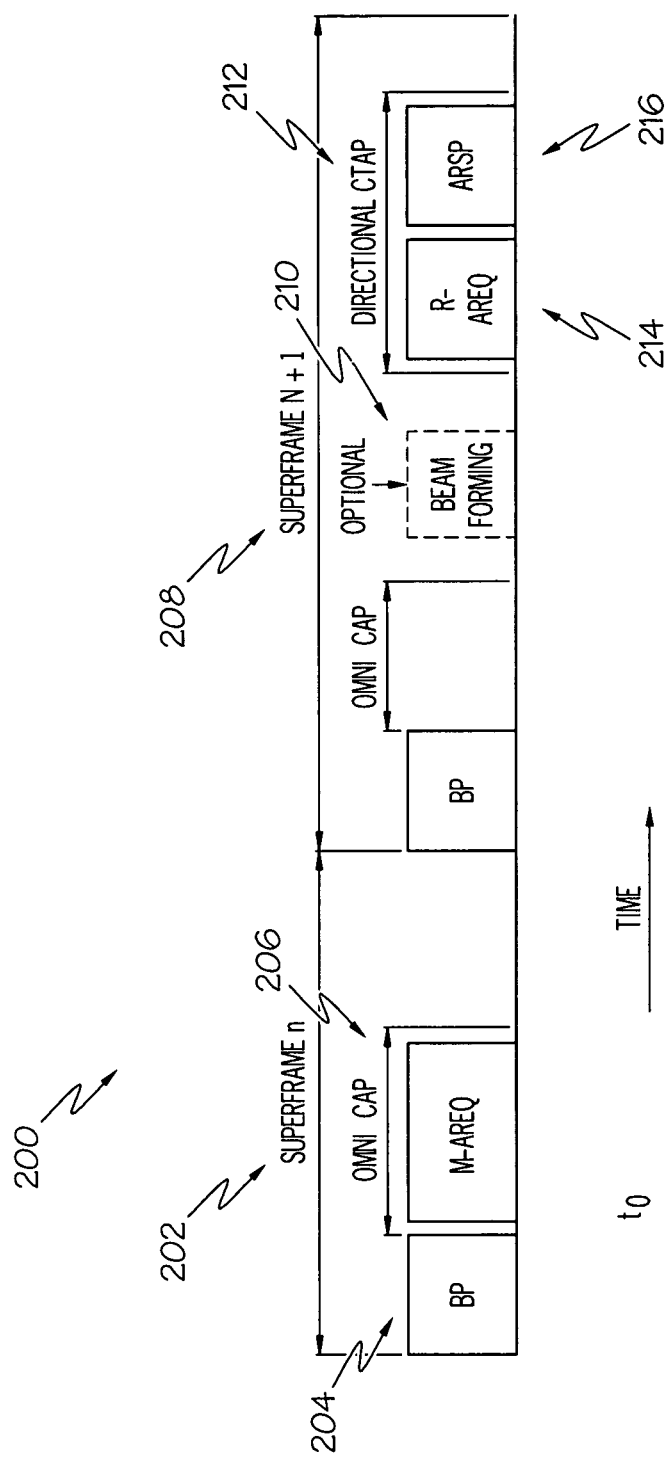
FIG. 2 is a timing diagram depicting a possible timing configuration for a station association process.

Referring to FIG. 2, a timing diagram for a two step station association process is illustrated. The depicted association process can depict communications between a network communications controller and a station. The timing diagram depicted can provide one of many ways to implement the teachings herein. In accordance with the present disclosure, a traditional association request (AREQ) can be divided into two parts, a minimum AREQ (M-AREQ) 206, and the remaining AREQ (R-AREQ) 214. The two-step association process can allow beamforming to occur between time slots allocated for transmissions and such beamforming can be commenced after exchange of minimal association data between a station and a controller. In some embodiments, the association process can occur in different superframes. During a subsequent superframe 208, a much higher data rate can be utilized to conduct the association process and thus, the disclosed association requires much less bandwidth or use up less "air time" compared to conventional association procedures.

After a beacon period (BP) 204 and reception of a beacon signal by a station, the station can transmit a minimum association request (M-AREQ) signal during an omni-contention access period (CAP) 206 using an omni-directional transmission. Generally, after the NCC's transmission in the BP 204, the NCC can address network association requests from stations. In some embodiments, a NCC operation can be compatible with the IEEE 802 set of standards where a medium access control (MAC) address can be utilized as part of an association request. The MAC address typically can take up six (6) bytes. The station can send its MAC address as part of the M-AREQ transmission during the omni-CAP period 206 and the NCC can detect the direction of the incoming signal and the MAC address. The NCC can allocate time for, or commence beamforming after the omni-CAP period 206. For example, and as illustrated, beamforming in both the station and the controller can be commenced in a second superframe 208 after an omni-CAP period.

Detection of a specific type of transmission, specific data in a specific type of transmission, and/or a time delay from a detected phenomenon could be utilized to trigger the beamforming of one or more stations and possibly the NCC. In accordance with some embodiments, the channel allocation for beamforming may be optional. In such a configuration, there may be no need to allocate a specific time for beamforming.

Beamforming between the station and the NCC could also take place based solely on the omni beacon from station B 204 or the omni association request (M-AREQ) from station B 204, without an association request. It can be appreciated that the initial portion of the association transmission can be in accordance with traditional system and may not need to be altered to accommodate the improvements disclosed herein. In some embodiments, the association request message can be sent in omni mode, the association response can be sent in a directional mode, and beamforming for the station and the NCC can occur between the exchange of messages or requests and responses.

In accordance with the present disclosure, the information typically provided by the traditional association request in a single block of time with a relatively slow data rate can be broken up into smaller segments where the second typically larger segment can be performed at a much higher data rate. Thus, in the R-AREQ transmission, more data can be exchanged in a smaller time period than is exchanged in the M-AREQ. The relatively short M-AREQ communication interval, which can contain the station's MAC address, can be sent at a relatively low data rate and the remainder of the association request the R-AREQ can utilize a significantly higher data rate during the directional CTAP period 212. It can be appreciated that the M-AREQ segment can be as few as twelve 12 bytes to convey information including the MAC address and the R-AREQ segment can be limited to twenty two (22) bytes.

During the next superframe, (i.e. superframe n+1 208), another BP can occur and then an omni-CAP transmission can occur. After the omni-CAP transmission in the second superframe, beamforming can be commenced by one or more stations and/or the NCC. The beamforming can be triggered in the NCC and can be triggered by the station by the Omni-CAP transmission in the previous superframe. Many other phenomena could be utilized to trigger beamforming, such as reception of the MAC address of the station, reception of a specific number of bits, etc.

A station and a NCC can be accomplished beamforming during the optional beamforming period 210. After the optional beamforming period 210, a station can request and receive allocation for a channel time allocation period or directional CTAP 212. Thus, directional high speed communications can be utilized for the remainder of the association process. Thus, the remainder of the process can include transmitting the remainder of the association request at a higher data rate in a directional mode. After such a transmission is complete, an association request response can be sent during an association request response period (ARSP) 216.

To calculate the time consumed by the two part association process, the slower transmission rate during the M-AREQ can be calculated as 50 usec+92*8/1 Mbps+12*8/1 Mbps=50+736+96=882 usec. The time required by the R-AREQ can be relatively short because the R-AREA can occur at a higher transmission rate. The time allocated for the R-AREQ can be calculated as 1.6 usec+0.9 usec+22*8/952 Mbps=1.6+0.9+0.185=2.685 usec. To complete the association process utilizing the higher data rate, the time taken by ARSP can be calculated as 1.6 usec+0.9 usec+14*8/952 Mbps=1.6+0.9+0.118=2.618 usec. Hence, the total time for association can be calculated/estimated to be 887.303 usec. Remarkably, the disclosed association can (according to calculations) reduce the bandwidth required for device association by 52%. This reduction can equate to a considerable improvement in spectrum efficiency over traditional systems.

As stated above, the diagram illustrates time intervals known as superframes. Initially, or at time zero "$t_0$", a station can transmit one or more signals during a beacon period (BP) 204. The BP 204 can be utilized to define and synchronize the communications between nodes or stations in a wireless network as described above. Information conveyed during the BP 204 can dictate or control when each station will transmit or each station will be allowed to transmit data. Such management can avoid simultaneous transmissions by stations that interfere with each other.

A typical beacon frame may be approximately fifty bytes long, with about half of the bytes providing a common frame header and cyclic redundancy checking (CRC) field that may be utilized for error detection. As with other frames, the common frame header can include source and destination MAC addresses, as well as other information regarding the communications process. In the NCC's transmission the destination address can be set to all logical ones such that the Medium Access Control (MAC) address of the NCC is received by each station in proximity to the NCC.

Each station that has the NCC's MAC address can join the network and can receive and process beacon transmissions. The body of the beacon's frame can reside between the header and the CRC field and can constitute approximately one half of the beacon frame. Each beacon frame can include a beacon interval, a time stamp, support rates, parameter sets, capability information, and a service set identifier (SSID) among other things and such information can organize communications.

Figure 3:
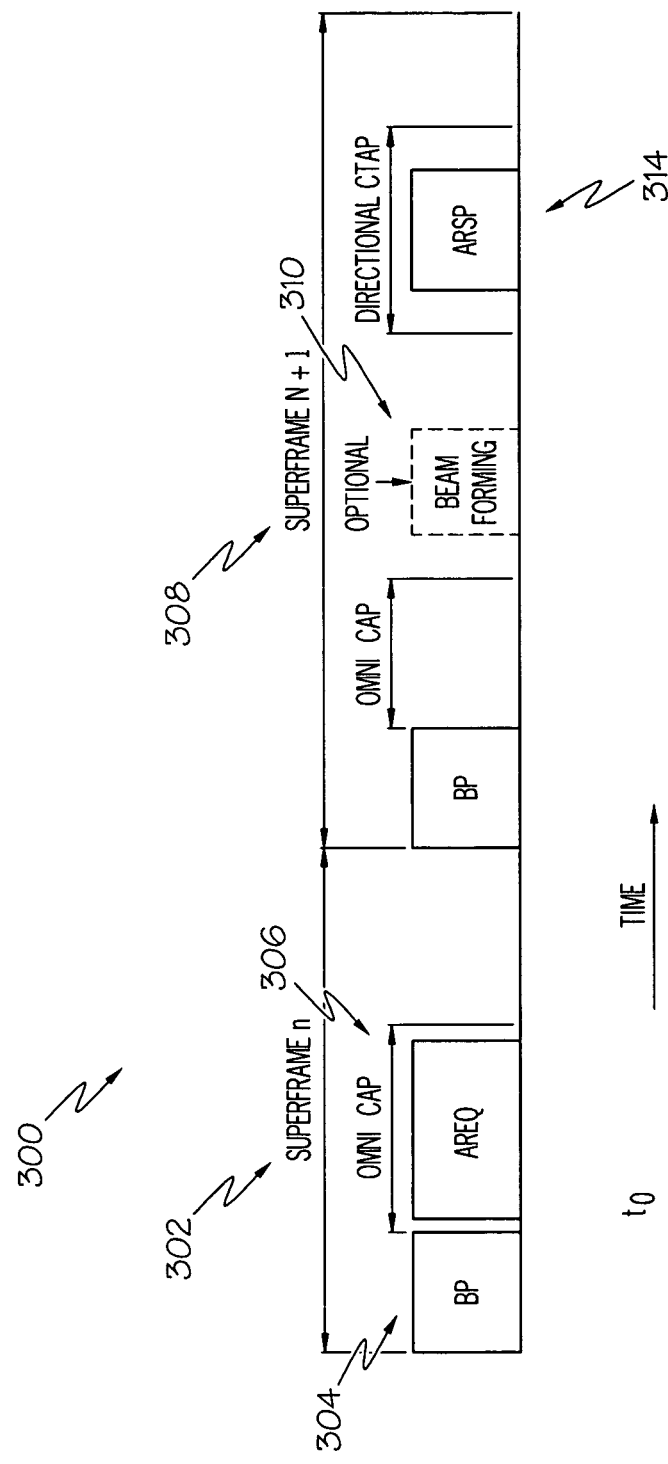
FIG. 3 is another timing diagram depicting another possible timing configuration for a station association process.

Referring to FIG. 3, an association request can be accomplished during a single AREQ time interval. As described above with respect to FIG. 2, at time zero "$t_0$", a network communication controller (NCC) can transmit data during a beacon period (BP) 304. The data transmitted during the BP 304 can be utilized to set-up and/or maintain network communication timing. During the first super frame 302, there can be an omni-directional transmission contention access period (omni-CAP) communication 306 where stations can transmit.

During a subsequent superframe (superframe n+1 308), a second beacon period (BP) and an omni-CAP transmission can occur. An optional beamforming period 310 can occur based on a trigger from previous signal and/or a time delay. After the optional beamforming period 310, a directional high speed CTAP transmission can occur to provide a station with an acceptance to the request during the ARSP time interval 314. The timing arrangements depicted assume that at least one of the stations involved in the association process has directional communication or beamforming capabilities.

Figure 4:
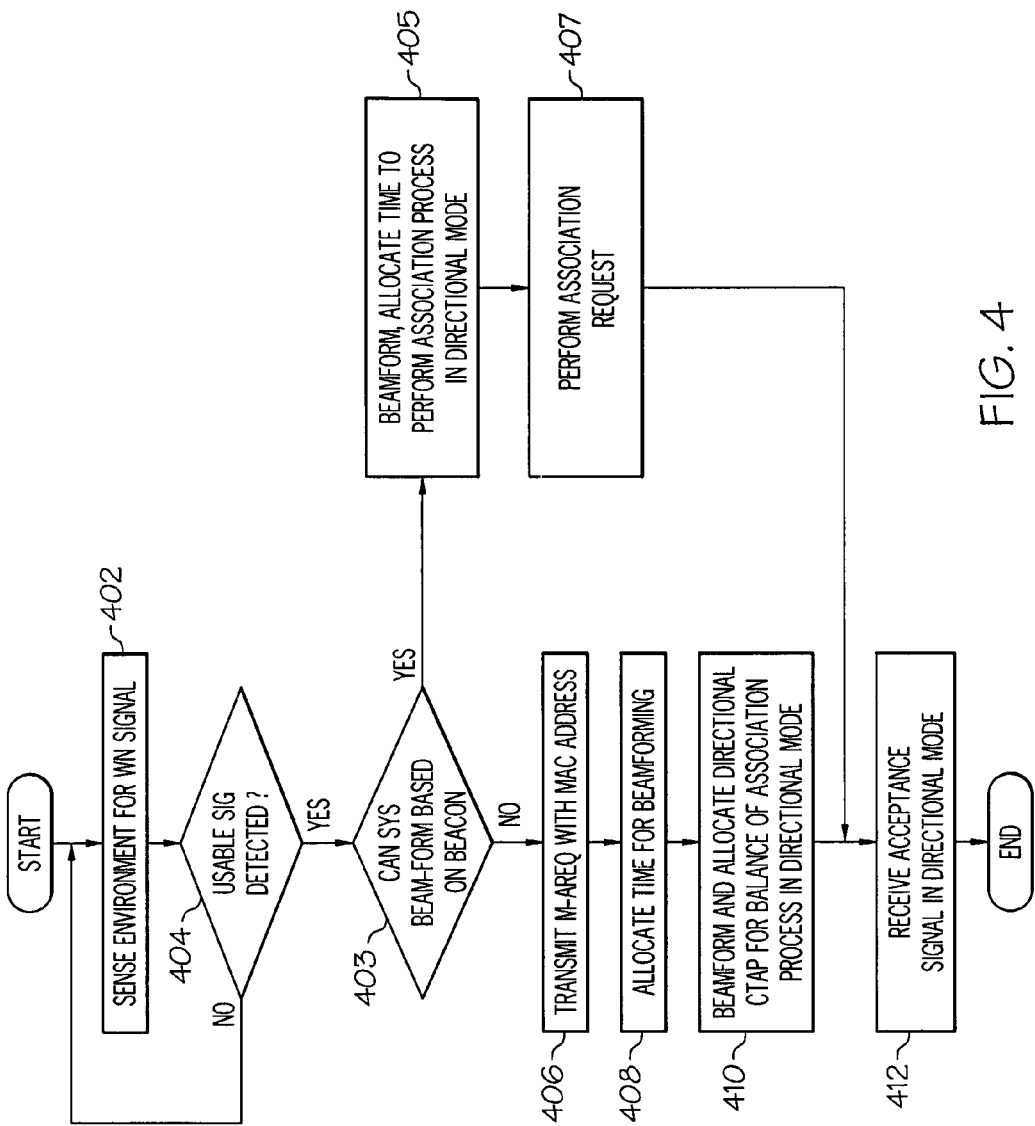
FIG. 4 is a flow diagram illustrating a method for achieving station association in a network.

FIG. 4 depicts a method for performing association requests. As described above, the mode of communication (directional or omni) can rely on whether beamforming has been achieved. As illustrated by block 402, the environment can be monitored to detect if there can be a useable wireless signal. The signal can be a beacon transmitted and received in an omni-directional transmission. As illustrated by decision block 403, it can be determined if a useable signal can be received. In some embodiments, when beacons from multiple controllers are received, a controller that can provide the most desired communication link can be selected by the station. The process can revert to block 402 where the system can continue to monitor the environment if there is no useable signal detected.

If a useable signal is detected, then as illustrated by block 404 it can be determined if the station can beamform based on the beacon. If the station can beamform based on the beacon then as illustrated by block 405 the station can beamform, allocate time to perform the association process. As illustrated by block 407 the station can request association and perform the association process in a directional mode and the controller can beamform and transition to an association process. As illustrated by block 412 the station can receive an acceptance signal in a directional mode and the process can end thereafter.

If at block 404 the station cannot beamform based on the beacon then as illustrated by block 406, a minimum association request can be transmitted. The minimum association request can include a MAC address that is transmitted in an omni-directional mode. As illustrated by block 408, a time for beamforming can be allocated.

As illustrated by block 410, the station and the controller can beamform and allocate time for a directional channel time allocation period. A directional transmission can occur for the balance of the association process. The controller can send an association acceptance signal and the station can receive the acceptance signal as illustrated by block 412. The process can end thereafter.

Generally, the method can include receiving a beacon from a source by an antenna array, allocating resources to beamform and beamforming after receiving at least a portion of the beacon. The beamforming can be accomplished prior to completion of an association request and prior to receipt of an acceptance signal in response to the association request.

Accordingly, directional transmissions can be utilized by transmitting at least part of an association request and an acceptance signal corresponding to the association request. An association request can be a message which is "broken up" into two parts, namely, the minimum data required to create an association and the remaining association request data. The minimum data can be sent in omni mode while the remaining association request data and the association response can be sent in directional mode. Beamforming can be performed between two association request transmissions.

It can be appreciated that in some embodiments minimal or no changes need to me made to either the association request or response messages. The association request can be sent in an omni mode, while the association response can be sent in a directional mode. Beamforming can be accomplished between these two messages (omni mode and directional mode.)

The timing arrangement described in FIG. 3 is similar to the arrangements described in FIG. 2. FIG. 3 discloses that the time allocation for beamforming can possibly be improved if the station and the NCC beamform during a time interval between the beacon and AREQ time interval. To calculate the time consumed by the association process using this single step method, the time taken by AREQ is 50 usec+92*8/1 Mbps+22*8/1 Mbps=50+736+176=962 usec, while the time taken by ARSP is 1.6 usec+0.9 usec+14*8/952 Mbps=1.6+0.9+0.118=2.618 usec. Hence, the total time for association is approximately 964.618 usec. It can be appreciated that the reduction in the time required for association provided by the disclosed arrangements improves the spectrum efficiency by approximately 48% over traditional association configurations.

The station can then utilize a sectored antenna in accordance with the previous association request transmission. When sectored antennas are used, re-association request initiated by the station may start from the old known PNC direction. The PNC can provide an answer to the request based on the DOA. The association request can be repeated in different directions if no ACK is received from the PNC.

In accordance with the present disclosure, the amount of time stations and network controllers spend in an omni mode during association process can be significantly reduced. In some embodiments a significant part of the association process can be performed in the directional mode. In some embodiments, the usage of the omni mode during association can be limited to the minimum necessary information, while the bulk of the process can be performed in a directional mode thereby achieving higher speeds and shorter association times.

Each arrangement herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory stations within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In some embodiments, the methods disclosed can be implemented in software, which includes but is not limited to firmware, resident software, microcode, etc. Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or station.

System components can retrieve instructions from an electronic storage medium. The medium can be an electronic, magnetic, optical, electromagnetic, infrared, or semiconductor system (or apparatus or station) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O stations (including but not limited to keyboards, displays, pointing stations, etc.) can be coupled to the system either directly or through intervening I/O controllers. Network adapters may also be coupled to the system to enable the data processing system to become coupled to other data processing systems or remote printers or storage stations through intervening private or public networks. Modems, cable modem and Ethernet cards are just a few of the currently available types of network adapters.

It will be apparent to those skilled in the art having the benefit of this disclosure that the disclosure contemplates methods, systems, and media that can provide the above mentioned features. It is understood that the form of the embodiments shown and described in the detailed description and the drawings are to be taken merely as possibly ways to build and utilize the disclosed teachings. It is intended that the following claims be interpreted broadly to embrace all the variations of the example embodiments disclosed.

What is claimed is:

1. A method comprising:
   receiving at least a portion of a beacon from a source by at least one antenna;
   allocating resources to perform beamforming;
   beamforming after receiving the at least a portion of the beacon and prior to receipt of an association request acceptance signal; and
   utilizing a directional configuration to communicate at least a portion of an association response that occurs in response to an association request, the association request comprising a transmission of a plurality of bits; wherein a majority of the plurality of bits of the association request are received in a directional mode.

2. The method of claim 1 further comprising transmitting a media access control address in response to the beacon.

3. The method of claim 1 wherein beamforming comprises determining a relative direction from the at least one antenna to the source.

4. The method of claim 1 further comprising transmitting a media access control address in response to the beacon and triggering the beamforming based on receipt of the at least a portion of the beacon.

5. The method of claim 1 further comprising sending a re-association request in a directional mode.

6. The method of claim 1 wherein the directional transmission utilizes a higher data rate than an omni-directional transmission.

7. The method of claim 1 wherein determining the relative direction comprises determining one of direction of arrival information, an angle of arrival, a time difference of arrival or a frequency difference of arrival.

8. An apparatus comprising:
a sensor to receive an incoming signal;
a direction detect module to detect a direction of origin of the incoming signal;
a beamformer module to beamform towards the incoming signal;
a trigger module to trigger the beamforming module to beamform, wherein the trigger module activates the beamformer module before an end of an association process; and
a receiver to receive a directional transmission during the association process, the directional transmission comprising an association request comprising a plurality of bits, wherein a majority of the plurality of bits are received in a directional mode.

9. The apparatus of claim 8 wherein the beacon is sent in an omni-directional transmission with a lower data rate than a data rate of the directional transmission.

10. The apparatus of claim 8 wherein the incoming signal is a beacon.

11. The apparatus of claim 8 further comprising a receiver to receive an association request acceptance signal.

12. The apparatus of claim 8 further comprising transmitting a re-association request utilizing data from the beamforming.

13. A non-transitory computer readable storage medium including instructions that, when executed by one or more processors, cause the one or more processors to:
receive a beacon from a source by at least one antenna;
allocate resources to perform beamforming; and
beamform after receiving at least a portion of the beacon and prior to receipt of an association request acceptance signal;
utilize a directional configuration to communicate at least a portion of an association response that occurs in response to an association request, the association request comprising a transmission of a plurality of bits;
wherein, a majority of the plurality of bits of the association request are received in a directional mode.

14. The non-transitory computer readable storage medium of claim 13, wherein the one or more processors are further configured to transmit a media access control address in response to the received beacon.

15. The non-transitory computer readable storage medium of claim 13, wherein the one or more processors are further configured to determine a relative direction from the at least one antenna to the source as part of the beamforming process.

16. The non-transitory computer readable storage medium of claim 13, wherein the one or more processors are further configured to transmit a media access control address in response to the beacon and trigger the beamforming based on receipt of at least a portion of the beacon.

17. A method comprising:
receiving a beacon transmission from a remote wireless communications device;
based at least on a portion of the beacon transmission, performing millimeter wave beamforming towards the remote wireless communications device; and
engaging in an association process comprising transmitting an association request, the association request comprising a plurality of bits;
wherein said beamforming begins before completion of the association process and a majority of the plurality of bits of the association request are transmitted in a directional mode.

18. The method of claim 17, further comprising detecting a direction of origin of the beacon.

19. The method of claim 18, wherein said engaging in the association process further comprises:
receiving an association response from the remote wireless communications device.

20. The method of claim 17, wherein the remote wireless communications device is a network controller device.

21. The method of claim 17, wherein said beamforming begins before starting of the association process with the remote wireless communications device.

22. An apparatus comprising:
a receiver to receive a beacon from a remote wireless communications device;
a beamformer module to, based at least on a portion of the beacon, perform millimeter wave beamforming towards the remote wireless communications device; and
a trigger module to trigger the beamforming module to beamform, wherein the trigger module activates the beamformer module before an end of an association process, the association process comprising an association request comprising a plurality of bits, wherein a majority of the plurality of bits are communicated in a directional mode.

23. The apparatus of claim 22, further comprising a direction detect module to detect a direction of origin of the beacon.

24. The apparatus of claim 22, wherein the association process includes the exchange of messages with the remote wireless communications device, the messages including the association request and an association response.

25. The apparatus of claim 24, further comprising a transmitter to transmit the association request, and wherein the receiver is configured to receive the association response.

26. The apparatus of claim 22, wherein the trigger module is configured to activate the beamformer module before a start of the association process.

27. The apparatus of claim 22, wherein the remote wireless communications device is a network controller device.

28. A non-transitory computer readable storage medium including instructions that, when executed by one or more processors cause the one or more processors to:
receive a beacon transmission from a remote wireless communications device;
based at least on a portion of the beacon transmission, perform millimeter wave beamforming towards the remote wireless communications device; and
engage in an association process, wherein the engaging causes the one or more processors to transmit an association request, the association request comprising a plurality of bits;
wherein said beamforming begins before completion of the association process and a majority of the plurality of bits of the association request are transmitted in a directional mode.

* * * * *